United States Patent [19]

Nakane et al.

[11] Patent Number: 5,079,284

[45] Date of Patent: Jan. 7, 1992

[54] RESIN MODIFIER AND MODIFIED RESIN

[75] Inventors: Toshio Nakane, Fuji; Yukihiko Kageyama, Fujinomiya; Kenji Hijikata, Mishima, all of Japan

[73] Assignee: Polyplastics Co., Ltd., Osaka, Japan

[21] Appl. No.: 477,152

[22] Filed: Feb. 8, 1990

Related U.S. Application Data

[63] Continuation of Ser. No. 244,175, Sep. 14, 1988, abandoned.

[30] Foreign Application Priority Data

Oct. 2, 1987 [JP] Japan .................. 62-249195

[51] Int. Cl.$^5$ .................. C08K 5/35; C08K 5/353; C08K 5/357; C08K 5/3412; C08G 73/06

[52] U.S. Cl. .................. 524/97; 523/456; 523/461; 524/86; 524/95; 524/96; 524/98; 524/102; 524/105; 525/408; 525/409; 525/420; 525/359.2; 525/436; 525/448

[58] Field of Search .......... 525/408, 409, 448, 436, 525/437, 420, 359.2; 524/86, 95, 97, 96, 98, 102, 105; 528/289; 523/456, 461

[56] References Cited

U.S. PATENT DOCUMENTS

| | | | |
|---|---|---|---|
| 3,563,920 | 2/1971 | Tomalia et al. .................. | 260/2 |
| 3,594,387 | 7/1971 | Metzger .......................... | 260/307 |
| 3,660,522 | 5/1972 | Schneider et al. .............. | 260/78 |
| 3,676,424 | 7/1972 | Christena et al. .............. | 260/239 |
| 3,689,499 | 9/1972 | Metzger .......................... | 260/307 |
| 3,697,486 | 10/1972 | Dobinson et al. .............. | 260/78 |
| 3,770,693 | 11/1973 | Metzger .......................... | 260/45.8 |
| 3,794,617 | 2/1974 | Mains et al. .................... | 260/47 |
| 3,873,504 | 3/1975 | Boettcher et al. .............. | 260/47 |
| 3,887,523 | 6/1975 | Yau et al. ........................ | 260/47 |
| 3,959,215 | 5/1976 | Schneider ....................... | 260/45.8 |
| 4,035,542 | 7/1977 | Rosenthal et al. .............. | 428/224 |
| 4,080,360 | 3/1978 | Schlicting et al. .............. | 524/98 |
| 4,093,585 | 6/1978 | Teige et al. ..................... | 260/40 |
| 4,097,444 | 6/1978 | Teige et al. ..................... | 260/40 |
| 4,123,419 | 10/1978 | Heiss et al. ...................... | 524/95 |
| 4,205,176 | 5/1980 | Zestermann et al. ........... | 524/95 |
| 4,226,948 | 10/1980 | Popoff et al. ................... | 521/167 |
| 4,499,219 | 2/1985 | Buxbaum et al. ............... | 524/94 |
| 4,548,964 | 10/1985 | Yoshida et al. ................. | 523/455 |
| 4,762,883 | 8/1988 | Goel ................................ | 525/113 |
| 4,954,540 | 9/1990 | Nakane et al. .................. | 524/86 |
| 4,954,541 | 9/1990 | Nakane et al. .................. | 524/86 |

FOREIGN PATENT DOCUMENTS

| | | |
|---|---|---|
| 0019061 | 11/1980 | European Pat. Off. . |
| 0141345 | 5/1985 | European Pat. Off. . |
| 0273368 | 7/1988 | European Pat. Off. . |
| 2533097 | 2/1977 | Fed. Rep. of Germany . |
| 56-120757 | 9/1981 | Japan . |
| 57-2353 | 1/1982 | Japan . |
| 59-6244 | 1/1984 | Japan . |

OTHER PUBLICATIONS

Journal of Applied Polymer Science, vol. 34, No. 8, 12/87, pp. 2769–2776.
Journal of Applied Polymer Science, vol. 32, No. 4, 9/86, pp. 4581–4594.
Patent Abstracts of Japan, vol. 9, No. 233 (C-304)(1956), 9/19/85.
Patent Abstracts of Japan, vol. 13, No. 158 (C-586) (3506), 4/17/89.
Patent Abstracts of Japan, vol. 13, No. 63 (C-568)(3411), 2/13/89.
WPIL, File Supplier, accession No. 87-254834, Derwent Publications.
WPIL, File Supplier, accession No. 87-254835, Derwent Publications.

*Primary Examiner*—Veronica P. Hoke
*Attorney, Agent, or Firm*—Nixon & Vanderhye

[57] ABSTRACT

A polymer such as polyester is modified with reaction with a modifier of a compound having the formula:

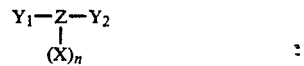

in which X is halogen, $Y_1$ and $Y_2$ are a three- to eight-membered ring, Z is a divalent organic group and n is 1 or more.

10 Claims, No Drawings

RESIN MODIFIER AND MODIFIED RESIN

This is a continuation of application Ser. No. 07/244,175, filed Sept. 14, 1988, now abandoned.

FIELD OF THE INVENTION

The present invention relates to a resin modifier capable of imparting fire retardance to a resin through a simple method and a resin modified by making use of the same. More particularly, this invention relates to a resin modifier capable of not only imparting thermal stability and flexibility to a resin, but also giving a surface appearance free from bleeding thereof from the resin and a resin modified therewith.

BACKGROUND OF THE INVENTION

Various methods are known which impart fire retardance to a resin. These methods are classified broadly into an addition type method and a reaction type method. In the former method, antimony hydroxide, antimony trioxide, boron compounds, bromine compounds, and phosphorus compounds are used, and flame retardation can be attained through a simple method. However, the former method is disadvantageous in that the compound bleeds from the surface of the resin during prolonged environmental exposure or when exposed to a heated atmosphere thereby spoiling the surface appearance and lowering the flexibility. In the latter method, an epoxy group, a vinyl group, an ester forming functional group, or the like is introduced as a reactive group into a monomer, an oligomer, and a polymer of a bromine compound, a phosphorus compound, or the like, and these fire-retardant groups are incorporated into the molecular skeleton or incorporated into a polymer molecule through a reaction between polymers. The reaction type method not only is free from bleeding but also can impart flexibility and therefore is a useful method which can eliminate the drawbacks of the former method. However, in the latter method, complicated procedures are required in order to incorporate a fire-retardant monomer into a polymer skeleton because no increase in the degree of polymerization can be attained by an ordinary method. The addition of a reactive fire-retardant oligomer or polymer is a simple expedient to overcome such a difficulty. However, this method unfavorably brings about an interaction between the additive and the base polymer during kneading, which leads to lowering in both the molecular weight and the mechanical properties. This tendency is particularly significant in polyesters and polyamides.

SUMMARY OF THE INVENTION

The present invention addresses the above-mentioned problems by providing a simple method which can impart to a polymer thermal stability, flexibility and other physical properties. The resins of this invention exhibit fire retardance properties and excellent surface appearance without exhibiting decreased mechanical properties.

Specifically, the present invention provides a resin modifier comprising a compound represented by the following general formula (1):

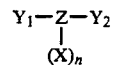

(1)

wherein X is a halogen, $Y_1$ and $Y_2$, which may be the same or different, are each a three- to eight-membered cyclic reactive group selected from among functional groups represented by the following general formulae (2) to (5):

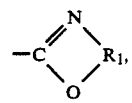

(2)

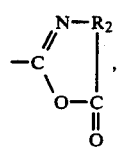

(3)

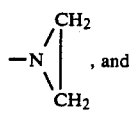

(4)

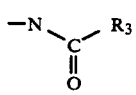

(5)

wherein $R_1$ to $R_3$ are each a divalent organic group, provided that hydrogen directly attached to the ring may be substituted with an alkyl and/or an aryl, Z is a divalent organic group and n is an integer of 1 or more, and a resin modified with said modifier.

DETAILED DESCRIPTION OF THE INVENTION

As mentioned above, the present invention provides a resin modifier having a compound represented by the formula (1).

It is preferred in the formulae (1) to (5) that $R_1$ to $R_3$ each are a straight alkylene having 1 to 6 carbon atoms and may have a substituent(s) such as an alkyl having 1 to 10 carbon atoms, more preferably 1 to 6, and an aryl having 6 to 12 carbon atoms, more preferably phenyl, provided that the groups (2), (3) and (5) each is a 3- to 8-membered ring. It is more preferable that $R_1$ is ethylene or ethylene group having a C1 to C6 alkyl or phenyl; $R_2$ is methylene or ethylene which may have a substituent(s) such as a C1 to C4 alkyl or phenyl; $R_3$ is a straight C3 to C5 alkylene which may have a substituent(s) such as a C1 to C4 alkyl or phenyl. It is preferable that $-Z(X)n-$ is selected from the groups (6) to (12). It may contain two or more groups selected from the groups (6) to (12). When a dicarboxylic compound are reacted with each other, two groups are contained in Z.

In the general formula (1), X is a halogen, and examples thereof include chlorine and bromine. Bromine is more preferable from the viewpoint of prevention of environmental pollution.

It is preferred that the group represented by the formula

in the formula (1) representing the compound constituting the modifier of the present invention be a divalent organic group containing at least one residue of a brominated diol, a brominated carboxylic acid, a brominated diglycidyl ester and/or a brominated diglycidyl ether, etc. each having a molecular weight of 390 or more. Particularly preferable examples of the residue include those of a brominated diol and/or a brominated dicarboxylic acid. Specific examples of the organic group include a divalent organic group having, as the constituent unit, at least one of at least one kind of groups represented by the following general formula (6) to (12):

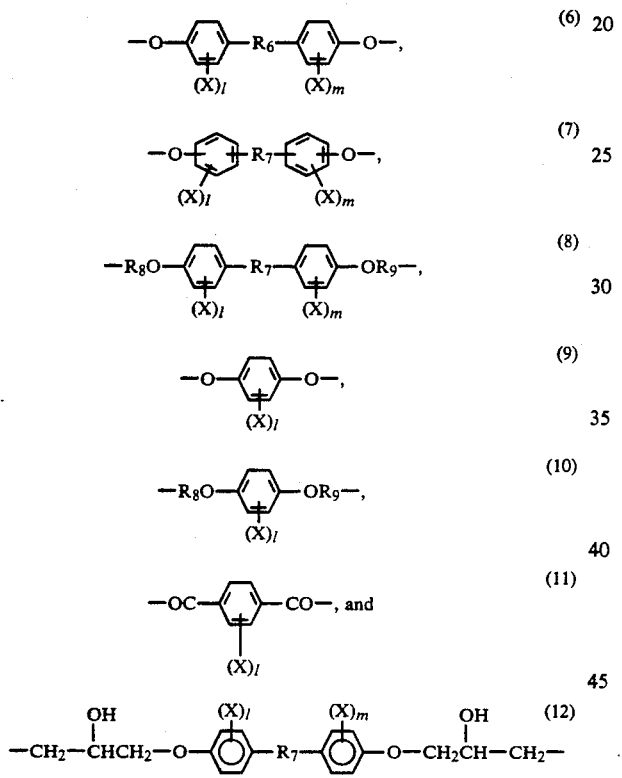

wherein $R_6$ and $R_7$ are each $-CH_2-$, $$-\underset{\underset{CH_3}{|}}{\overset{\overset{CH_3}{|}}{C}}-,$$

$-O-$, $-S-$, or $-SO_2-$;

$R_8$ and $R_9$ are each $-C_2H_4-$, $-C_3H_6-$, $-(C_2H_4O)n-$, or $-(C_3H_6O)n-$; l and m are each an integer of 1 to 4; and X and n are as defined above.

When bromine is used as the halogen, examples of the group represented by the general formula (6) include residues of tetrabromobisphenol A and tetrabromobisphenol sulfone, examples of the group represented by the general formula (7) include a residue of tetrabromobisphenol F, examples of the group represented by the general formula (8) include residues of an adduct of tetrabromobisphenol A with 2 mol of ethylene oxide, an adduct of tetrabromobisphenol A with 2 mol of propylene oxide, an adduct of tetrabromobisphenol sulfone with 2 mol of ethylene oxide, and an adduct of tetrabromobisphenol sulfone with 2 mol of propylene oxide, examples of the group represented by the general formula (9) include a residue of tetrabromohydroquinone, examples of the group represented by the general formula (10) include a residue of an adduct of tetrabromohydroquinone with 2 mol of ethylene oxide, and examples of the group represented by the general formula (11) include a residue of tetrabromoterephthalic acid.

These bromine compounds may be used alone. Further, they may also be used in the form of a divalent organic group incorporated as a repeating unit into an oligomer or a polymer prepared by reacting these bromine compounds with other compounds, such as dicarboxylic acid, diol, or diepoxide.

The three- to eight-membered cyclic reactive groups represented by the above general formulae (2) to (5) may be introduced by various methods.

The group represented by the above formula (2) is preferably a group wherein $R_1$ is an ethylene group, i.e., oxazoline. The oxazoline may be produced by an expedient such as a reaction of a carboxylic acid with ethanolamine. Alternatively, an oxazoline compound which has previously been prepared may be subjected to an addition reaction to prepare the compound represented by the above formula (1). Particularly, in the latter case, it is preferable from the viewpoint of the reactivity to use a bisoxazoline compound. If desired, it is possible to use a catalyst such as a tertiary amine or a phosphine in the reaction of the oxazoline.

Specific examples of the bisoxazoline compound for introducing the group represented by the above formula (2) include 2,2'-methylenebis(2-oxazoline), 2,2'-ethylenebis(2-oxazoline), 2-2'-ethylenebis(4-methyl-2-oxazoline), 2,2'-propylenebis(2-oxazoline), 2,2'-tetramethylenebis(2-oxazoline), 2,2'-hexamethylenebis(2-oxazoline), 2,2'-octamethylenebis(2-oxazoline), 2,2'-p-phenylenebis(2-oxazoline), 2,2'-p-phenylenebis(4-methyl-2-oxazoline), 2,2'-p-phenylenebis(4,4-dimethyl-2-oxazoline), 2,2'-p-phenylenebis(4-phenyl-2-oxazoline), 2,2'-m-phenylenebis(2-oxazoline), 2,2'-m-phenylenebis(4-methyl-2-oxazoline),2,2'-m-phenylenebis(4,4-dimethyl-2-oxazoline), 2,2'-m-phenylenebis(4-phenyl-2-oxazoline), 2,2'-o-phenylenebis(2-oxazoline), 2,2'-phenylbis(4-methyl-2-oxazoline), 2,2'-bis(2-oxazoline), 2,2'-bis(4-methyl-2-oxazoline), 2,2'-bis(4-ethyl-2-oxazoline), and 2,2'-bis(4-phenyl-2-oxazoline). These bisoxazoline compounds may be used alone or in a combination of two or more of them.

Among these bisoxazoline compounds, those containing an aromatic ring group are preferable, and those containing a phenylene group are more preferable. A particularly preferable bisoxazoline compound is 2,2'-m-phenylenebis(2-oxazoline).

The group represented by the above general formula (3) is preferably a group wherein $R_2$ is methylene, i.e., oxazolone, and a group wherein $R_2$ is ethylene, i.e., oxazinone. These groups can easily be prepared by dehydrating an N-acyl-α-amino carboxylic acid or an N-acyl-β-amino carboxylic acid with, e.g., acetic anhydride. Therefore, these groups may be introduced as a terminal of a derivative of a compound represented by the above formula (1) by the above-described method. Alternatively, bisoxazolone or bisoxazinone which has previously been prepared may be bonded to the terminal through a reaction to prepare a compound represented by the above formula (1).

Examples of the bisoxazolone compound include 2,2'-bis(5(4H)-oxazolone), 2,2'-methylenebis(5(4H)-oxazolone), 2,2'-ethylenebis(5(4H)-oxazolone), 2,2'-tetramethylenebis(5(4H)-oxazolone), 2,2'-hexamethylenebis(5(4H)-oxazolone), 2,2'-decamethylenebis(5(4H)-oxazolone), 2,2'-p-phenylenebis(5(4H)-oxazolone), 2,2'-m-(5(4H)-oxazolone), 2,2'-diphenylenebis(5(4H)-oxazolone), 2,2'-(1,4-cyclohexylene)-bis(5(4H)-oxazolone), 2,2'-bis(4-methyl-5(4H)-oxazolone), 2,2'-methylenebis(4-methyl-5(4H)-oxazolone), 2,2'-ethylenebis(4-methyl-5(4H)-oxazolone), 2,2'-tetramethylenebis(4-methyl-5(4H)-oxazolone), 2,2'-hexamethylenebis(4-methyl-5(4H)-oxazolone), 2,2'-decamethylenebis(4-methyl-5(4H)-oxazolone), 2,2'-p-phenylenebis(4-methyl-5(4H)-oxazolone), 2,2'-m-phenylenebis(4-methyl-5(4H)-oxazolone), 2,2'-naphthalenebis(4-methyl-5(4H)-oxazolone), 2,2'-diphenylenebis(4-methyl-5(4H)-oxazolone), 2,2'-(1,4-cyclohexylene)-bis(4-methyl-5(4H)-oxazolone), 2,2'-bis(4,4-dimethyl-5(4H)-oxazolone), 2,2'-methylenebis(4,4-dimethyl-5(4H)-oxazolone), 2,2'-ethylenebis(4,4-dimethyl-5(4H)-oxazolone), 2,2'-tetramethylenebis(4,4-dimethyl-5(4H)-oxazolone), 2,2'-hexamethylenebis(4,4-dimethyl-5(4H)-oxazolone), 2,2'-octamethylenebis(4,4-dimethyl-5(4H)-oxazolone), 2,2'-decamethylenebis(4,4-dimethyl-5(4H)-oxazolone), 2,2'-p-phenylenebis(4,4-dimethyl)-5(4H)-oxazolone), 2,2'-m-phenylenebis-(4,4-dimethyl-5(4H)-oxazolone), 2,2'-naphthalenebis-(4,4-dimethyl-5(4H)-oxazolone), 2,2'-diphenylenebis-(4,4-dimethyl-5(4H)-oxazolone), 2,2'-(1,4-cyclohexylene)-bis(4,4-dimethyl-5(4H)-oxazolone), 2,2'-bis(4-isopropyl-5(4H)-oxazolone), 2,2'-tetramethylenebis(4-isopropyl-5(4H)-oxazolone ), 2,2'-hexamethylenebis(4-isopropyl-5(4H)-oxazolone), 2,2'-p-phenylenebis(4-isopropyl-5(4H)-oxazolone), 2,2'-m-phenylenebis(4-isopropyl-5(4H)-oxazolone), 2,2'-naphthalenebis(4-isopropyl-5(4H)-oxazolone), 2,2'-bis(4-isobutyl-5(4H)-oxazolone), 2,2'-methylenebis(4-isobutyl-5(4H)-oxazolone), 2,2'-ethylenebis(4-isobutyl-5(4H)-oxazolone), 2,2'-tetramethylenebis(4-isobutyl-5(4H)-oxazolone), 2,2'-hexamethylenebis(4-isobutyl-5(4H)-oxazolone), 2,2'-p-phenylenebis(4-isobutyl-5(4H)-oxazolone), 2,2'-m-phenylenebis(4-isobutyl-5(4H)-oxazolone), and 2,2'-naphthalenebis(4-isobutyl-5(4H)-oxazolone).

Examples of the bisoxazinone compound include 2,2'-bis(3,1-benzoxazin-4-one), 2,2'-methylenebis(3,1-benzoxazin-4-one), 2,2'-ethylenebis(3,1-benzoxazin-4-one), 2,2'-tetramethylenebis(3,1-benzoxazin-4-one), 2,2'-hexamethylenebis(3,1-benzoxazin-4-one), 2,2'-decamethylenebis(3,1-benzoxazin-4-one), 2,2'-p-phenylenebis(3,1-benzoxazin-4-one), 2,2-m-phenylenebis(3,1-benzoxazin-4-one), 2,2'-naphthalenebis(3,1-benzoxazin-4-one), 2,2'-(4,4-diphenylene)bis(3,1-benzoxazin-4-one), 2,2'-(1,4-cyclohexylene)bis(3,1-benzoxazin-4-one), 2,2'-bis(4,4-dihydro-1,3,6H-oxazin-6-one), 2,2'-methylenebis(4,5-dihydro-1,3,6H-oxazin-6-one), 2,2'-ethylenebis(4,5-dihydro-1,3,6H-oxazin-6-one), 2,2'-tetramethylenebis(4,5-dihydro-1,3,6H-oxazin-6-one), 2,2'-p-phenylenebis(4,5-dihydro-1,3,6H-oxazin-6-one), 2,2'-m-phenylenebis(4,5-dihydro-1,3,6H-oxazin-6-one), 2,2'-bis(4-methyl-5-hydro-1,3,6H-oxazin-6-one), 2,,2'-ethylenebis(4-methyl-5-hydro-1,3,6H-oxazin-6-one), 2,2'-o-phenylenebis-(4-methyl-5-hydro-1,3,6H-oxazin-6-one), 2,2'-m-phenylene(4-methyl-5-hydro-1,3,6H-oxazin-6-one), 2,2'-p-phenylenebis(4-hydro-5-methyl-1,3,6H-oxazin-6-one), and 2,2'm-phenylenebis(4-hydro-5-methyl-1,3,6H-oxazin-6-one).

The aziridine group represented by the above formula (4) can easily be produced by reacting ethyleneimine with an acid chloride or an isocyanate compound. It is preferred to bond a bisaziridine compound prepared by reacting ethyleneimine with a diisocyanate compound to the terminal of a compound having the above-described group represented by the formula

through a reaction to prepare a compound represented by the above formula (1).

The lactam group represented by the above formula (5) is preferably a group wherein $R_3$ is trimethylene, i.e., pyrrolidone, a group wherein $R_3$ is tetramethylene, i.e., piperidone, and a group wherein $R_3$ is pentamethylene, i.e., caprolactam. As with the group represented by the above formula (4), the lactam group represented by the above formula (5) can easily be prepared by reacting a lactam with an acid chloride or an isocyanate compound.

The functional groups respectively represented by the formulae (4) and (5) may be introduced by treating the terminal of the above-described compound having a group represented by the formula

with these substances. Alternatively, these groups may be introduced into the terminal of the group represented by the formula

bislactam which has previously been reacted with a diisocyanate compound. Examples of the acid chloride used in these reactions include derivatives of terephthalic, isophthalic, naphthalenedicarboxylic, adipic, sebacic, trimellitic and succinic acids.

Examples of the diisocyanate include toluene diisocyanate, methylenediphenyl diisocyanate, xylylene diisocyanate, naphthylene diisocyanate, 3,3'-dimethyldiphenyl 4,4'-diisocyanate, hexamethylene diisocyanate, isophorone diisocyanate, a hydrogenation product of methylenebiphenyl diisocyanate, a hydrogenation production of toluene diisocyanate, lysine diisocyanate, and bis(2-isocyanatoethyl) fumarate.

The molecular weight of the compound represented by the formula (1) is preferably 500 to 5,000. When the molecular weight is less than 500, the efficiency of the impartation of fire retardance is poor. On the other hand, when the molecular weight exceeds 5,000, the mechanical properties of the added polymer are unfavorably spoiled.

Representative examples of a substance which may be modified by addition of a modifier comprising a compound represented by the formula (1) according to the present invention include a polymer having in its chain at least one group of at least one member selected from among carboxylate, hydroxyl, amino, amide, and epoxy groups, etc. These groups may be bonded to not only the terminal of the polymer chain but also the polymer chain in a pendant form.

Examples of these polymers include polyester, polyamide, polyamic acid, polyimide, polyester amide, and polyepoxide. They may be used alone or in any combination of two or more of them.

The modifier of the present invention is used in an amount of preferably 0.1 to 70% by weight based on the polymer to be modified. The modifier of the present invention may simply be added to and kneaded with a polymer to be modified by an ordinary method, thereby attaining a modification effect on the fire retardance or the like. Further, it is also possible to react part or the whole of the modifier with the polymer so that the modifier serves as the component of the polymer. Specifically, the modifier compound represented by the formula (1) may be reacted with at least one compound having at least two of at least one functional group selected from among carboxylate, hydroxyl, amino, amide, and epoxy groups to prepare a polymer. The polymer thus obtained is remarkably excellent in fire retardance.

The modified resin of the present invention can easily be prepared by kneading, in a molten state, the modifier of the present invention with the resin to be modified as described above by making use of a single-screw or multi-screw extruder according to an ordinary method, followed by molding. Particularly, when the formation of a chemical bond through a reaction of a modifier with a resin is intended, a combined use of a suitable reaction accelerator is more effective.

Further, the modified resin of the present invention may be used in the form of a composition containing a modified resin according to the purposes by adding and kneading conventional additives generally known as an additive for a resin composition with the modified resin of the present invention during the preparation thereof or in a separate manner. Examples of the additive and filler useful for this purpose include at least one member selected from among plasticizers, stabilizers such as antioxidants and ultraviolet absorbers, antistatic agents, surface treatments, surfactants, flameproof auxiliaries, colorants such as dyes and pigments, lubricants for improving flowability and releasability, lubricating agents, crystallization accelerators (nucleating agents), inorganic or high-melting organic fibrous reinforcements such as glass fiber and carbon fiber, or particulate or sheet-form inorganic fillers.

As is apparent from the description and the examples, the present invention provides a novel resin modifier, and a modified resin prepared by making use of the resin modifier of the present invention is a resin which has sufficient fire retardance and further, as opposed to the resin fire-retarded by the conventional method, causes no lowering in the mechanical properties, has excellent heat resistance, and causes neither deterioration of the surface appearance nor other unfavorable phenomena due to the bleeding of the fire retardant or the like, i.e., has a combination of excellent fire retardance with other various excellent properties.

[EXAMPLES]

The present invention will now be described with reference to the following Examples which should not be construed as limiting the scope of the present invention.

REFERENTIAL EXAMPLE 1

<Preparation Of A Compound Represented By The General F.formula (1)>

54.4 parts by weight of tetrabromobisphenol A, 45.2 parts by weight of m-phenylenebisoxazoline, and 0.5 part by weight of triphenylphosphine were heated under reflux for 4 hr in a xylene-acetone mixed solvent. The reaction mixture was washed with methanol and chloroform to prepare 64.3 parts by weight of a reaction product. It was confirmed by FT-IR and NMR analyses that the reaction product was a compound having an oxazoline ring at its both terminals. The compound thus prepared will be abbreviated to "TBA-BoZ". A product of a reaction of tetrabromobisphenol A with 2,2-bis(5(4H)-oxazolone) (abbreviated to "TBA-BoZN"), a product of a reaction of a tetrabromobisphenol sulfone/ethylene oxide (2 mol) adduct with 2,2'-bis(5(4H)oxazolone) (abbreviated to "TBS-2EO-BoZN"), a product of a reaction of tetrabromoterephthalic acid with diphenylmethane-bis-(4,4'-N,N'-diethyleneurea) (abbreviated to "TBTA-MDI-EI"), and a product of a reaction of tetrabromobisphenol A with diphenylmethanebis(4,4'-carbamoyl-$\epsilon$-caprolactam) (abbreviated to "TBA-MDI-CPL") were prepared in the same manner as that described above.

Further, 51.0 parts by weight of dimethyl tetrabromoterephthalate, 19.2 parts by weight of dimethyl isophthalate, and 126.4 parts by weight of an adduct of tetrabromobisphenol A with 2 mol of ethylene oxide were melted in a reactor and reacted under reduced pressure, thereby preparing an oligomer having a yellowish brown color. The oligomer thus prepared was subjected to gel permeation chromatography and found to have an average molecular weight of 3,200. To 100 parts by weight of the above-prepared oligomer was added 13.5 parts by weight of m-phenylenebisoxazoline. The mixture was allowed to react for 30 min while melting at 260° C. in a nitrogen gas stream. The reaction mixture was allowed to cool and ground to prepare an oligomer powder (abbreviated to "BrEST-BoZ").

EXAMPLE 1

87.5 parts by weight of polybutylene terephthalate (PBT) was mixed with 12.5 parts by weight of the powdery modifier compound TBA-BoZ as prepared above, followed by homogeneous melt mixing with an ordinary extruder to form pellets. Specimens were prepared from the pellets by making use of an injection molding machine according to an ordinary method to evaluate the physical properties.

The physical properties were measured by the following methods.

The tensile strength and degree of elongation (%) were measured according to ASTM D 638, while the Izod impact strength was measured according to ASTM D 256. The breakdown strength was measured by the short-term test according to ASTM D 149. With respect to the surface appearance, the specimen was maintained at 120° C. for 72 hr to observe the surface. When abnormal phenomena, such as bleeding or blistering, were observed on the surface, the surface appearance was regarded as poor (X), while when the surface was free from such abnormal phenomena, the surface appearance was regarded as good (O). The oxygen index was measured according to JIS K 7201.

bromodiphenyl ether was used as the fire retardant. The results are shown in Table 1.

TABLE 1

|  |  | PBT |  |  |  |  |  | Comp. |
|---|---|---|---|---|---|---|---|---|
|  |  | Ex. 1 | Ex. 2 | Ex. 3 | Ex. 4 | Ex. 5 | Ex. 6 | Ex. 1 |
| additives | TBA-BoZ (pts. by wt.) | 12.5 | — | — | — | — | — | — |
|  | TBA-BoZN (pts. by wt.) | — | 12.5 | — | — | — | — | — |
|  | TBS-2EO-BoZN (pts. by wt.) | — | — | 12.5 | — | — | — | — |
|  | TBTA-MDI-EI (pts. by wt.) | — | — | — | 12.5 | — | — | — |
|  | TBA-MDI-CPL (pts. by wt.) | — | — | — | — | 12.5 | — | — |
|  | BrEST-Boz (pts. by wt.) | — | — | — | — | — | 12.5 | — |
|  | fire retardant (pts. by wt.) | — | — | — | — | — | — | 12.5 |
| tensile strength (kg/cm$^2$) |  | 585 | 580 | 582 | 579 | 564 | 575 | 540 |
| percentage elongation in tension (%) |  | 354 | 351 | 355 | 342 | 310 | 356 | 70 |
| Izod impact strength (notched) (kg-cm/cm) |  | 14 | 14 | 16 | 14 | 11 | 7.0 | 2.6 |
| breakdown strength |  | 16 | 16 | 16 | 16 | 16 | 16 | 14 |
| surface appearance |  | O | O | O | O | O | O | X |
| oxygen index |  | 27 | 27 | 27 | 27 | 27 | 27 | 27 |
| after heat treatment for 500 hr | tensile strength | 297 | 288 | 309 | 274 | 245 | 310 | 12 |
|  | percentage retention of elongation (%) | 84 | 82 | 87 | 80 | 79 | 87 | 17 |
|  | flexibility | O | O | O | O | O | O | X |

A tensile specimen was stored in a thermostatted bath of 120° C. for 500 hr and then subjected to measurement of the degree of elongation in the same manner as that described above, followed by calculation of percentage retention of elongation. Further, a sheet having a thickness of 200 μm was prepared by means of a hot press. After the sheet was stored at 120° C. for 500 hr, it was folded ten times at an angle of 90°. Thereafter, the surface appearance was examined to evaluate the flexibility. When abnormal phenomena, such as occurrence of breaking and fine cracks, were observed on the surface, the flexibility was regarded as poor (X), while when the surface was free from such abnormal phenomena, the flexibility was regarded as good (O). The results of each measurement are shown in Table 1.

EXAMPLES 2 to 6

Specimens were prepared by making use of various modifiers prepared above according to the formulation shown in Table 1 in the same manner as that of Example 1. The physical properties of the specimens were measured, and the results are shown in Table 1.

COMPARATIVE EXAMPLE 1

The same procedures as those of Example 1 were repeated, except that 12.5 parts by weight of deca-

EXAMPLES 7 to 9

The modifiers as shown in Table 2 were mixed with a polymer in the same manner as that of Example 1, except that an aromatic polyester (PAR) comprising terephthalic acid, isophthalic acid, and bisphenol A was used as the resin to be modified, thereby preparing specimens, followed by measurements of the physical properties of the specimens. The results are shown in Table 2.

COMPARATIVE EXAMPLE 2

Decabromodiphenyl ether was used instead of the modifiers used in Examples 7 to 9. The results are shown in Table 2.

EXAMPLES 10 to 12

Specimens were prepared in the same manner as that of Example 1, except that nylon 66 comprising adipic acid and hexamethylenediamine was used as the resin to be modified, to evaluate the physical properties. The results are shown in Table 2.

COMPARATIVE EXAMPLE 3

The results in the case where decabromodiphenyl ether was used instead of the modifiers used in Examples 10 to 12 are also shown in Table 2.

TABLE 2

|  |  | PAR |  |  |  | nylon 66 |  |  |  |
|---|---|---|---|---|---|---|---|---|---|
|  |  | Ex. 7 | Ex. 8 | Ex. 9 | Comp. Ex. 2 | Ex. 10 | Ex. 11 | Ex. 12 | Comp. Ex. |
| additive | TBA-BoZ (pts. by wt.) | 4 | — | — | — | 6 | — | — | — |
|  | TBTA-MDI-EI (pts. by wt.) | — | 4 | — | — | — | 6 | — | — |
|  | BrEST-BoZ (pts. by wt.) | — | — | 4 | — | — | — | 6 | — |
|  | fire retardant (pts. by wt.) | — | — | — | 4 | — | — | — | 6 |
| tensile strength (kg/cm$^2$) |  | 740 | 730 | 730 | 710 | 870 | 865 | 850 | 835 |
| percentage elongation in tension (%) |  | 110 | 120 | 140 | 50 | 89 | 87 | 95 | 48 |
| Izod impact strength (notched) (kg-cm/cm) |  | 20 | 20 | 24 | 15 | 9.0 | 8.5 | 11 | 3.9 |
| breakdown strength |  | 24 | 24 | 24 | 20 | 24 | 24 | 24 | 21 |
| surface appearance |  | O | O | O | X | O | O | O | X |
| oxygen index |  | 29 | 29 | 29 | 29 | 28 | 28 | 28 | 28 |

TABLE 2-continued

| | | PAR | | | | nylon 66 | | | |
|---|---|---|---|---|---|---|---|---|---|
| | | Ex. 7 | Ex. 8 | Ex. 9 | Comp. Ex. 2 | Ex. 10 | Ex. 11 | Ex. 12 | Comp. Ex. |
| after heat treatment for 500 hr | tensile strength | 76 | 78 | 94 | 23 | 54 | 48 | 51 | 4 |
| | percentage retention of elongation (%) | 69 | 65 | 67 | 45 | 61 | 55 | 54 | 19 |
| | flexibility | ○ | ○ | ○ | X | ○ | ○ | ○ | X |

We claim:

1. A flame-retardant resin consisting essentially of a base polymer, and an effective flame-retarding amount of a resin modifier represented by the following general formula (1):

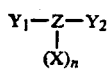   (1)

wherein X is a halogen, Z is a divalent organic group, n is an integer of 1 or more, $Y_1$ and $Y_2$ are each a three-membered cyclic reactive group represented by the following general formula (2):

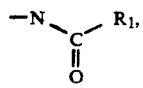   (2)

wherein $R_1$ is selected from straight chain alkylenes having 1 to 6 carbon atoms, provided that hydrogen directly attached to the ring may be substituted with an alkyl group having 1 to 10 carbon atoms and/or an aryl group having 6 to 12 carbon atoms, provided that the substituted aryl group in formula (2) is a three- to eight-membered ring, and wherein the resulting resin is flame-retarding and has an oxygen index of at least 27 according to JIS K 7201.

2. A flame-retardant resin as in claim 1 which is the reaction product of reacting said base polymer and said resin modifier.

3. A flame-retardant resin as in claim 1, wherein said resin modifier is present in an amount between 0.1 and 70 wt. % of said base polymer.

4. A flame-retardant resin as in claim 1, wherein said base polymer is selected from the group consisting of polyesters, polyamides, polyamic acids, polyimides, polyester amides and polyepoxides.

5. A flame-retardant resin consisting essentially of a base polymer, and an effective flame-retarding amount of a resin modifier represented by the following general formula (1):

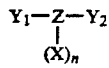   (1)

wherein X is a halogen, Z is a divalent organic group, n is an integer of 1 or more, $Y_1$ and $Y_2$ are each a three-membered cyclic reactive group represented by the following general formula (2):

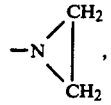   (2)

and wherein the resulting resin is a reaction product of reacting said base polymer and said resin modifier, and wherein the resulting resin is flame-retarding and has an oxygen index of at least 27 according to JIS K 7201.

6. A flame-retardant resin consisting essentially of a base polymer, and an effective flame-retarding amount of a resin modifier represented by the following general formula (1):

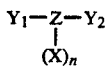   (1)

wherein X is a halogen, Z is a divalent organic group, n is an integer of 1 or more, $Y_1$ and $Y_2$, which may be the same or different, are each a three- to eight-membered cyclic reactive group which is at least one selected from among the functional groups represented by the following general formulas (2) and (3):

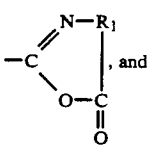   (2), and

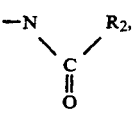   (3)

wherein $R_1$ and $R_2$ are each selected from straight chain alkylenes having 1 to 6 carbon atoms, provided that hydrogen directly attached to the ring may be substituted with an alkyl group having 1 to 10 carbon atoms and/or an aryl group having 6 to 12 carbon atoms, provided that the substituted aryl group in formulas (2) and (3) is a three- to eight-membered ring, and wherein the resulting resin is flame-retarding and has an oxygen index of at least 27 according to JIS K 7201.

7. A flame-retardant resin as in claim 6 which is the reaction product of reacting said base polymer and said resin modifier.

8. A flame-retardant resin as in claim 6, wherein said resin modifier is present in an amount between 0.1 and 70 wt. % of said base polymer.

9. A flame-retardant resin as in claim 6, wherein said base polymer is selected from the group consisting of polyesters, polyamides, polyamic acids, polyimides, polyester amides and polyepoxides.

10. A flame-retardant resin as in claim 6, wherein $R_1$ is selected from the group of methylene and ethylene.

* * * * *

UNITED STATES PATENT AND TRADEMARK OFFICE
CERTIFICATE OF CORRECTION

PATENT NO. : 5,079,284

DATED : January 7, 1992

INVENTOR(S) : Toshio NAKANE, et al

Page 1 of 2

It is certified that error appears in the above-identified patent and that said Letters Patent is hereby corrected as shown below:

ON THE TITLE PAGE:

At section [57] ABSTRACT, line 1, delete "with reaction".

Column 2, line 51, delete "is" and insert --are--.

Column 2, line 60, after "compound" insert --and a bisoxazoline such as 2,2'-m-phenylene-bis(2-oxazolin)--.

Column 4, line 54, delete "of" and insert --with--.

Column 6, line 46, before "bislactam" insert --in the form of bisaziridine or--.

Column 7, line 10, delete "of" (first occurrence), and insert --with--.

UNITED STATES PATENT AND TRADEMARK OFFICE
CERTIFICATE OF CORRECTION

PATENT NO. : 5,079,284

DATED : January 7, 1992

INVENTOR(S) : Toshio NAKANE, et al

It is certified that error appears in the above-identified patent and that said Letters Patent is hereby corrected as shown below:

Column 8, line 6, delete "F.formula' and insert --Formula--.

Signed and Sealed this

Sixth Day of July, 1993

Attest:

MICHAEL K. KIRK

*Attesting Officer*   Acting Commissioner of Patents and Trademarks